April 25, 1967    V. F. RILEY ET AL    3,315,921
STEERABLE GLIDING PARACHUTE
Filed May 10, 1965    3 Sheets-Sheet 1
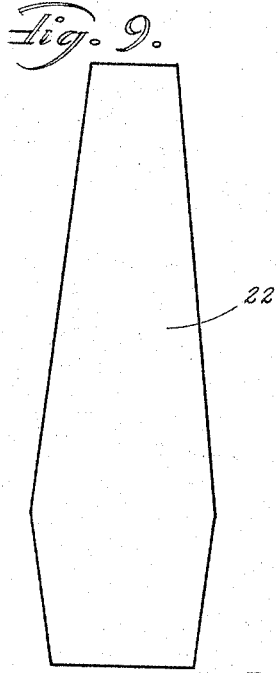
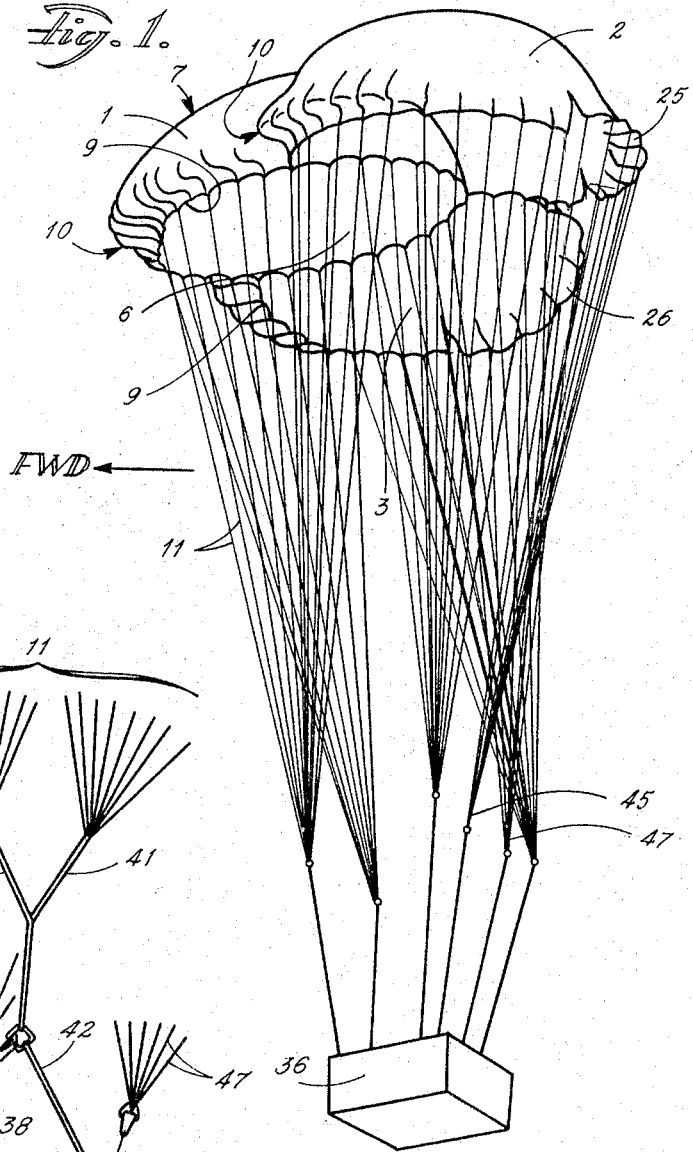
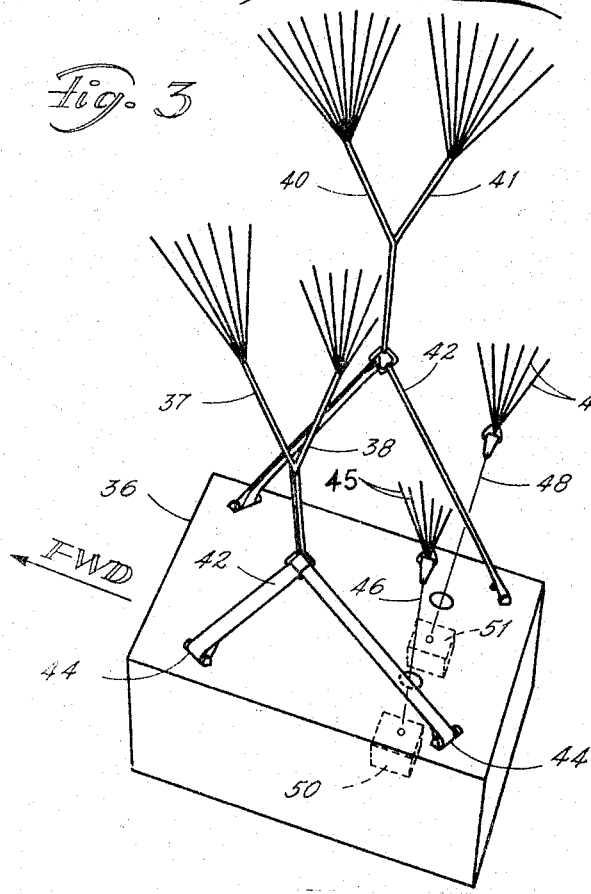
INVENTORS:
VINCENT F. RILEY
EUGENE M. LINHART
BY William W. Rundle
AGENT

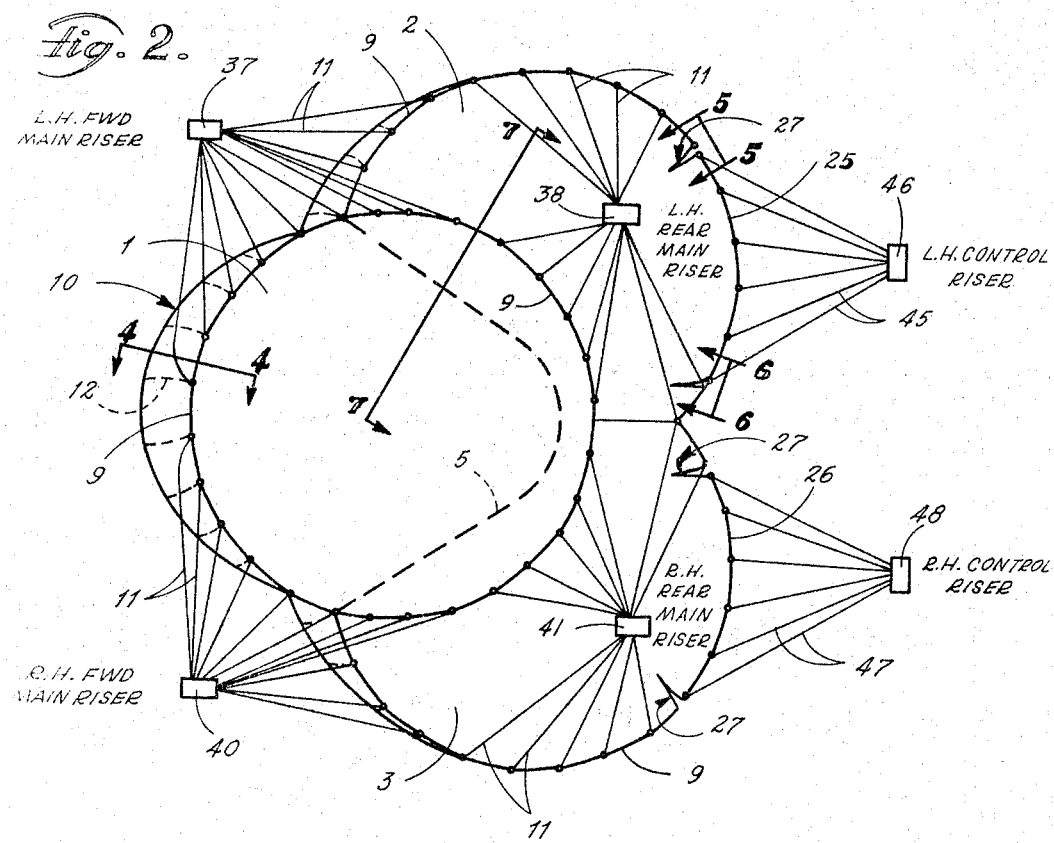
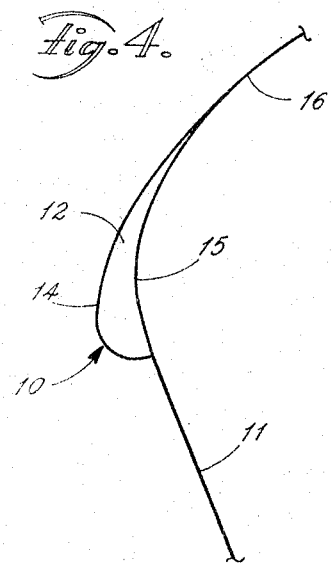
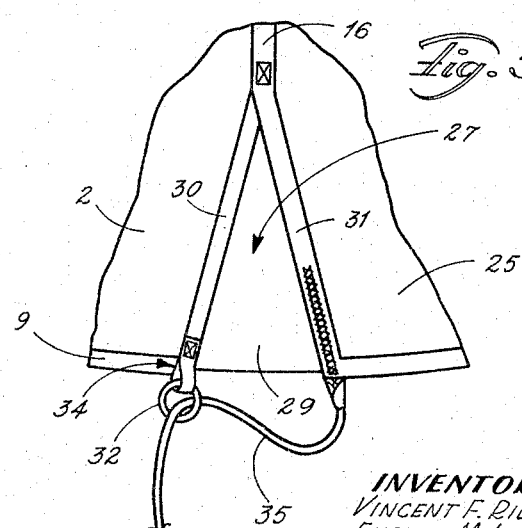

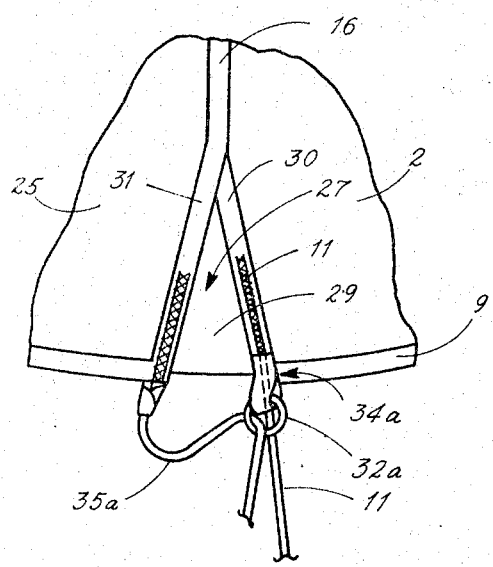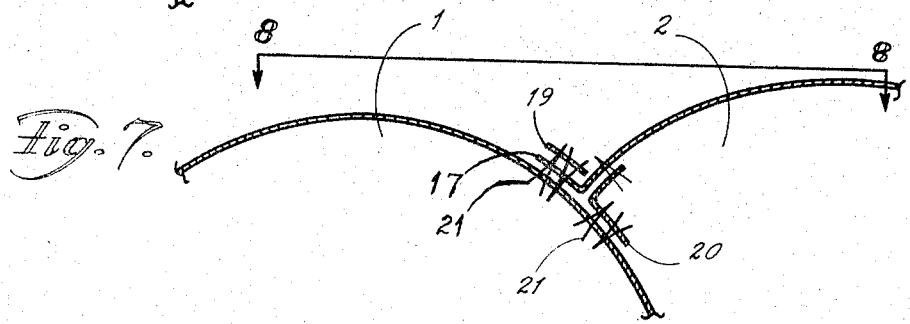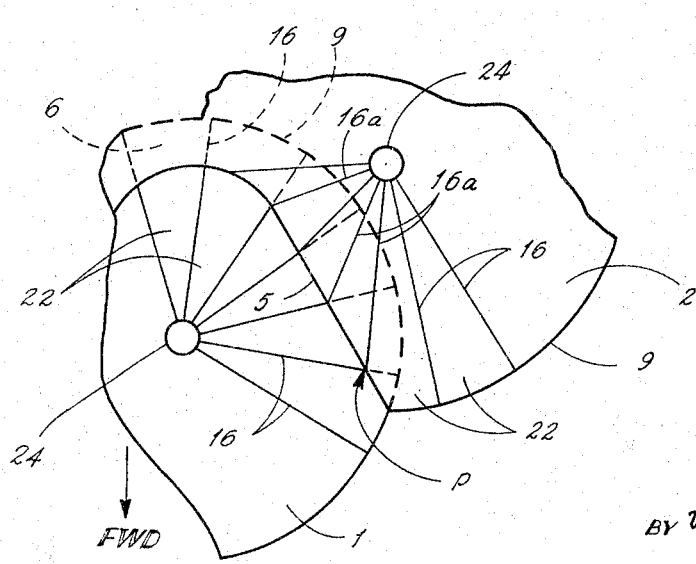

United States Patent Office 3,315,921
Patented Apr. 25, 1967

3,315,921
STEERABLE GLIDING PARACHUTE
Vincent F. Riley, Granada Hills, and Eugene M. Linhart, Van Nuys, Calif., assignors to Northrop Corporation, Beverly Hills, Calif., a corporation of California
Filed May 10, 1965, Ser. No. 454,362
12 Claims. (Cl. 244—152)

The present invention relates to parachutes, and more particularly, to a high performance gliding parachute with steering capabilities.

The problem of controlling parachutes in descent and landing is well known. Steerable parachutes with glide ratios of approximately .5 were available in the early 1930's. Glide ratio is defined as the ratio of lift to drag (L/D) and represents the ratio of horizontal travel to vertical travel (relative to the horizontal wind velocity) as the parachute descends. It is an object of this invention to provide a parachute capable of a glide ratio of 2.0 or higher.

The drag coefficient of a lift-producing surface is dependent on its aspect ratio. A further object of the present invention is to provide a gliding parachute having a greater aspect ratio than conventional canopy shapes, thus reducing the drag due to lift and providing the capability of higher lift-to-drag ratios.

For control of the glide angle and for steering in the desired direction, it is another object of this invention to provide a fast, logical, and simple gliding and steering means in a parachute.

Further objects are to provide such a parachute having excellent stability and control in pitch, yaw, and roll.

Briefly, our invention comprises an integral combination of three merged canopy portions constructed as a single unit. A first, forward, canopy portion is essentially a complete canopy, while a left rear canopy portion and a right rear canopy portion are each discontinued at their respective intersections with the upper side of the forward canopy portion. The front lobe of each canopy portion is extended forward beyond the conventional circular configuration and is rolled under at the skirt, thus forming a rounded leading edge profile. In these front lobes are preferably provided vertical interior gussets secured between parachute suspension lines and the canopy leading edges. Forward thrust producing means is provided integral with the rear of each rear canopy portion, such means preferably constituting a structural portion of the normal canopy surface.

Our invention will be more fully understood by reference to the detailed description of a specific embodiment to follow, in conjunction with the accompanying drawings thereof, wherein:

FIGURE 1 is a perspective view of a parachute according to our invention, showing the parachute in gliding flight.

FIGURE 2 is a bottom planform diagram of this parachute, showing the three canopy portions thereof as deployed and the manner of suspension line attachment thereto.

FIGURE 3 is an enlarged perspective view of the lower ends of the parachute suspension lines of FIGURE 1, showing a preferred means of attachment to the load.

FIGURE 4 is a partial sectional view taken where indicated by line 4—4 in FIGURE 2, showing the profile of a leading edge and a gusset located therein.

FIGURE 5 is a partial elevation view taken as indicated by line 5—5 in FIGURE 2 and rotated into vertical position, showing a corner of a glide control flap.

FIGURE 6 is a partial elevation view taken as indicated by line 6—6 in FIGURE 2, showing the other corner of the same glide control flap as in FIGURE 5.

FIGURE 7 is a vertical section taken as indicated by line 7—7 in FIGURE 2 and rotated into upright position, showing an intersection of a side canopy portion with the forward canopy portion.

FIGURE 8 is a partial top plan diagram viewed as indicated by the line 8—8 in FIGURE 7, showing relation of the respective radials of two intersecting canopy portions.

FIGURE 9 is a flat plan layout of a parachute gore located at one of the leading edge positions, showing a typical shape.

Referring first to FIGURE 1, the present parachute is seen to comprise a forward canopy 1, a left rear canopy portion 2, and a right rear canopy portion 3, preferably made of very low porosity material, the rear portions 2 and 3 intersecting the forward canopy 1, as further shown in FIGURE 2, along an intersection line 5. The rear skirt portion of the forward canopy 1 is continued below the intersection 5 in a substantially normal manner to result in an internal web 6 inside the three-canopy cluster. This web 6 retains a high internal pressure in the forward lobe. The surfaces of rear canopy portions 2 and 3 terminate at intersection line 5.

As best shown in FIGURE 1, the forward canopy 1 has been shaped by decreasing the normal width of gore material near the center of canopy 1, especially on the forward side thereof, giving a flattened profile 7 lower than the dome shape of the remainder of the parachute. Drag is thus reduced in the horizontal direction of glide.

In addition the forward side of all three canopy portions is extended or lengthened in the forward direction and rolled under at the skirts 9 to form rounded leading edges as indicated at 10. In gliding flight as pictured in FIGURE 1, the lower sides of these rounded leading edges 10 are somewhat dented inwardly due to external ram air pressure.

Parachute suspension lines 11 are attached to the skirts 9 as in conventional practice, but the skirts 9 are substantially inward of the canopy leading edges 10 as is evident. In most cases, the skirts 9 will remain in substantially circular shapes, except at the rear control flaps which will be described later.

To aid in maintaining the described canopy shape, a series of gussets 12 (FIGURE 4) is provided in the extended leading edges. These gussets 12 are of a curved quasi-triangular shape, graduated in size at the different positions. Outer sides 14 of gussets 12 (comprising actually the outer and lower edges) are attached to the canopy portions, while inner gusset edges 15 are attached to the suspension lines 11. The latter continue upwardly to where they coincide with radial tapes 16 which are stitched between gore panels as is customary.

FIGURE 7 shows a typical structure at the intersection of a rear canopy with the forward canopy. Here, the edge 17 of the left rear canopy portion 2 is folded at substantially 90 degrees to lie along the surface of the forward canopy 1. One piece of reinforcing tape 19 is laid over this edge 17, while another piece of doubler tape 20 is fitted along the corner between the rear canopy portion 2 and the forward canopy 1 on the opposite side from the folded edge 17. The tapes and edge are securely fastened together as by stitching 21.

In FIGURE 8, it will be seen that the various canopy gores 22 have radial tapes 16 between them which in the majority of instances extend from a canopy vent 24 to the various skirt portions. However, where the rear canopy portions 2 and 3 are discontinuous, the radial tapes 16a thereof end at the intersection line 5, and preferably meet the intersection line 5 where the forward canopy radials pass, i.e., point P for example. This will require making slightly different gore widths for certain gores in the affected areas but it is preferable for strength reasons to have the radials coincide or meet in this manner.

Along the trailing edge of each rear canopy portion 2 and 3, a glide control flap 25, 26 is provided. These flaps are each similar to that described and claimed in U.S. Patent No. 3,117,753, issued January 14, 1964. Flaps 25 and 26 are obtained by separating a group of rear gores from the main canopy at substantially radial slots 27 intersecting the skirts, thus allowing the flap to raise and trail slightly behind. As shown in FIGURES 5 and 6, each slot 27 is preferably filled in by a triangular seal panel 29 stitched along one side tot the main canopy portion 30 and along the other side to the flap end 31. When a flap 25 or 26 is closed, in conformity with a normal parachute shape, its respective seal panels 29 are merely bunched together along their bottoms; and when the flap is open for gliding or steering purposes, the seal panels 29 expand to a full deployed shape. Panels 29 prevent undesired loss of internal canopy pressure while the flap 25 or 26 is open.

As further shown in FIGURE 5, a control line ring 32 is attached to the corner 34 of the main canopy portion 30 next to the outward end of each flap 25 and 26. A glide control line 35 passes through this ring 32 and fastens to the skirt corner of the flap. No additional suspension line is provided at corner 34.

In FIGURE 6, a similar control line ring 32a is attached to the corner 34a of the main canopy portion next to the inward end of each flap 25 and 26. A similar glide control line 35a passes through ring 32a. However, in this instance, a regular suspension line 11 may be also attached to canopy corner 34a.

To obtain the herein described rounded leading edge "pockets" the individual gores 22 must be tailored to give the desired geometry. FIGURE 9 shows a typical flat pattern shape of one of the gores 22 in the leading edge areas.

In general, all suspension lines 11 on the left of the fore-and-aft parachute center line are routed to the left side of a connected load, and all suspension lines 11 on the right of the parachute are routed to the right side of the load. FIGURE 2 indicates diagrammatically a typical grouping of suspension lines 11, and FIGURE 3 illustrates how a load 36 may be attached. Approximately the forward half of the left side suspension lines 11 come together at the top of a left-hand forward main riser 37, and the other half to the top of a left-hand rear main riser 38 in this example. Similarly, the right side suspension lines 11 are provided with a right-hand forward and rear main riser 40 and 41 respectively. These four risers 37, 38, 40 and 41 are connected at their lower ends to a pair of harnesses 42 which are in turn preferably connected to four attach fittings 44 on the load 36. Other riser arrangements can obviously be employed to accommodate any number of suspension lines 11.

As further shown in FIGURES 2 and 3, six left-hand glide control lines 45, including the lines 35 and 35a shown in FIGURES 5 and 6, are connected from the skirt of the left-hand flap 25 to a left-hand control riser 46, and similarly, six right-hand control lines 47 are connected to a right-hand control riser 48.

Control risers 46 and 48 respectively pass to separate suitable control mechanisms 50 and 51 carried by the load 36, for extending and retracting the control lines 45 and 47.

The flaps 25 and 26 will both be open for maximum glide and closed for minimum glide. Variable glide is obviously attained by adjusting to intermediate positions of the flaps 25 and 26. They are differentially actuated to turn or steer the parachute in a different direction with respect to the ground.

Thus it is seen that a high-performance, stable, and reliable steerable gliding parachute has been provided. The maximum aerodynamic lift has been obtained by substantially increasing the aspect ratio beyond that of conventional canopy shapes. Aspect ratio is defined as the span squared divided by the planform area, where the span in this case is the effective overall span of the three-canopy cluster. The span might be further increased over that shown in the present illustrative embodiment by moving the centers of the rear side canopy portions 2 and 3 farther apart, so that the canopy portions 2 and 3 do not intersect each other.

The glide ratio attained by the present parachute is significantly higher than obtainable with three separate complete canopies, the latter being only about 1.0. Actual parachutes of the present invention have glided more than two feet horizontally (relative to the prevailing wind) for each one foot of descent.

The lowered profile and extended leading edges 10 result in a low drag. The rounded leading edge should be extended forward as far as possible while still keeping it substantially fully inflated. The leading edges may be barely curled inward or, for better effect, curved around to substantially a horizontal bottom (as shown herein) or slightly beyond.

High lift-to-drag ratios are obtainable without collapse of the canopies due to the interior web 6 and to the flap seals 29. The double flaps 25 and 26 and the means of keeping the extended leading edges inflated provide the high thrust needed for extremely good horizontal glide velocity.

The radial dimension of glide flaps 25 and 26 comprises about $1/10$ of the nominal diameter of the associated canopy. However, the length of the slots or breaks 27 governing the size of the flaps may range from about $1/20$ to $1/5$ of the canopy diameter in actual practice. The circumferential extent of the flaps can also be varied, of course. Moreover, it will be recognized that other thrust producing means may be employed on the rear canopy portions instead of the flaps as described herein, without departing from the essence of the present invention.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:
1. A steerable glide parachute comprising:
   (a) a cluster of three canopies intersecting each other to form a forward portion and two rear side portions, said portions being integrally fastened together;
   (b) a forwardly extended leading edge on each of said portions rolled under to meet a marginal skirt thereof; and
   (c) an extendable glide control flap at the rear of each said rear side portion.
2. A steerable glide parachute comprising:
   (a) a cluster of three canopies forming a forward portion and two rear side portions, said rear side canopy portions each intersecting said forward canopy portion;
   (b) a forwardly extended leading edge on each of said portions; and
   (c) forward thrust producing means at the rear of each said rear side portion.
3. Apparatus in accordance with claim 2 wherein said thrust means comprises an extendable flap formed from the surface of each said rear side portion by two substantially radial breaks through the skirt thereof, and a substantially triangular seal panel bridging at least one of said breaks.
4. Apparatus in accordance with claim 2 wherein said thrust means comprises an extendable flap at the rear of each said rear side portion, and including a first group of control lines connected to one of said flaps, a second group of control lines connected to the other said flap, and respective means connected to said control line groups to individually extend and retract said flaps, whereby the glide angle and direction are each variably controlled.

5. Apparatus in accordance with claim 2 wherein said rear side canopy portions are integrally fastened to said forward canopy portion, said forward portion having a rear surface thereof forming an interior web in said parachute, and suspension lines connected to said interior web.

6. Apparatus in accordance with claim 2 wherein said forward canopy portion has a lowered profile relative to said rear side portions provided by a reduced amount of material near the center of said forward portion.

7. Apparatus in accordance with claim 2 wherein said extended leading edge on at least one of said portions comprises:
 (a) progressively longer gores toward the most forward position thereof, said gores being rolled under at the skirt to form a rounded edge profile;
 (b) vertical interior gussets secured along their outer edges to the canopy surface of said extended leading edge from the skirt thereof upwardly to a predetermined point; and
 (c) suspension lines connected from said skirt of said gores at respective lower inner corners of said gussets, said suspension lines continuing upwardly to said predetermined point, and the inner edges of said gussets secured to said suspension lines.

8. Apparatus in accordance with claim 7 wherein some of said gores at said extended leading edge portion are narrower at the skirt thereof than at the forward extent of said leading edge.

9. In a gliding parachute having a canopy with a marginal skirt thereof, a leading edge construction comprising:
 (a) elongated gore panels in a forward portion only of said canopy, the lower ends of said elongated gore panels being curved radially inwardly of said canopy with said lower ends terminating at said skirt, thus forming an extended leading edge forwardly and outwardly of said skirt; and
 (b) a plurality of substantially vertical gussets internally of said extended leading edge and substantially perpendicular thereto, said gussets having their outer edges respectively secured to said elongated gore panels from said skirt upwardly to a predetermined point on said gore panels.

10. Apparatus in accordance with claim 9 wherein said forward portion extends around said canopy substantially 90 degrees to one side of the forward direction.

11. Apparatus in accordance with claim 9 wherein said elongated gore panels and said gussets are of progressively smaller size away from the forward direction, whereby a smoothly pointed planform shape of said canopy is obtained.

12. Apparatus in accordance with claim 9 including suspension lines attached to said skirt, the suspension lines at said forward portion being attached along the inner edges of said gussets.

References Cited by the Examiner
UNITED STATES PATENTS

| | | | |
|---|---|---|---|
| 1,287,134 | 12/1918 | Swanson | 244—152 X |
| 2,117,319 | 5/1938 | Hart | 244—152 X |
| 2,392,946 | 1/1946 | Quilter | 244—152 |
| 3,104,857 | 9/1963 | Knacke et al. | 244—145 |
| 3,170,660 | 2/1965 | Kehlet | 244—145 |

MILTON BUCHLER, *Primary Examiner.*
A. E. CORRIGAN, *Assistant Examiner.*